United States Patent
Hauser et al.

(12)
(10) Patent No.: US 6,382,491 B1
(45) Date of Patent: May 7, 2002

(54) SEAT FOR MOTOR VEHICLES

(75) Inventors: Gerhard Hauser, Sindelfingen; Hermann Kohfink, Laichingen; Georg Lidak, Bad Rappenau, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/637,861

(22) Filed: Aug. 15, 2000

(30) Foreign Application Priority Data

Sep. 13, 1999 (DE) .......................................... 199 43 573

(51) Int. Cl.[7] .............................. B60N 2/10; B60N 2/14; B60N 2/30
(52) U.S. Cl. ................................ 226/65.05; 296/65.09; 296/65.18; 297/335; 297/15
(58) Field of Search ......................... 296/65.05, 65.09, 296/65.18; 297/334, 335, 15

(56) References Cited

U.S. PATENT DOCUMENTS

| | | | | |
|---|---|---|---|---|
| 2,565,666 A | * | 8/1951 | Schaefer ................... | 296/65.09 |
| 2,962,084 A | | 11/1960 | Pickles | |
| 3,697,128 A | * | 10/1972 | Strien et al. ................ | 297/361 |
| 4,007,960 A | * | 2/1977 | Gaffney ..................... | 297/342 |
| 4,720,143 A | * | 1/1988 | Schwartz et al. ........... | 297/326 |
| 5,165,753 A | * | 11/1992 | Henderson ................. | 297/326 |
| 5,230,544 A | * | 7/1993 | Morritt et al. .............. | 296/65.1 |
| 5,702,154 A | * | 12/1997 | Schonenberg ............... | 297/257 |
| 5,810,290 A | | 9/1998 | Merensky et al. | |

FOREIGN PATENT DOCUMENTS

| | | |
|---|---|---|
| DE | 1904687 | 9/1970 |
| DE | 3643729 | 7/1988 |
| DE | 4126699 | 4/1993 |
| DE | 1954486 | 9/1998 |

* cited by examiner

*Primary Examiner*—Joseph D. Pape
*Assistant Examiner*—Hilary Gutman
(74) *Attorney, Agent, or Firm*—Crowell & Moring LLP

(57) ABSTRACT

A vehicle seat has a bottom part which is supported by a front leg and a back leg on the vehicle floor. Bottom ends of the legs are mounted pivotably on the vehicle floor and the top ends of the legs are mounted pivotably on the bottom part of the seat. The seat has a seat-adjustment device operable to adjust the seat between two positions in the direction of a seat longitudinal axis running from the back towards the front. This seat-adjustment device has a tube which is mounted pivotably on the vehicle floor, and a rod which is mounted in the tube in such a manner that it can be adjusted in two directions and is pivotably mounted on the bottom part of the seat. The seat-adjustment device has a locking device which fixes the tube and the rod in axial positions relative to one another, which positions are each associated with one of the seat positions.

24 Claims, 5 Drawing Sheets

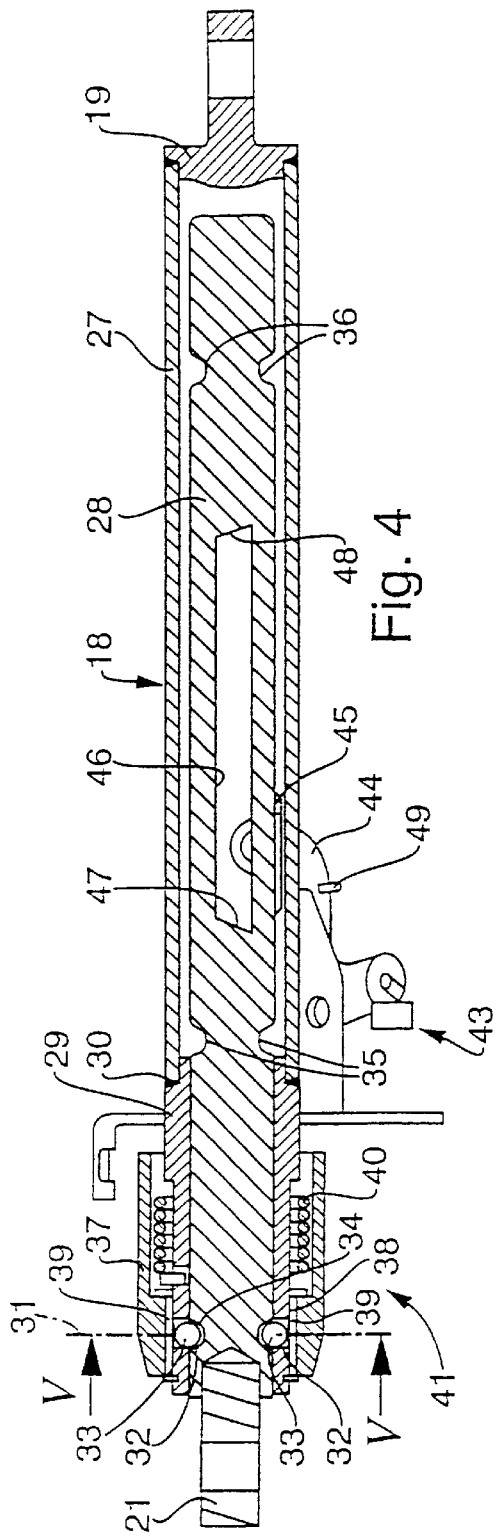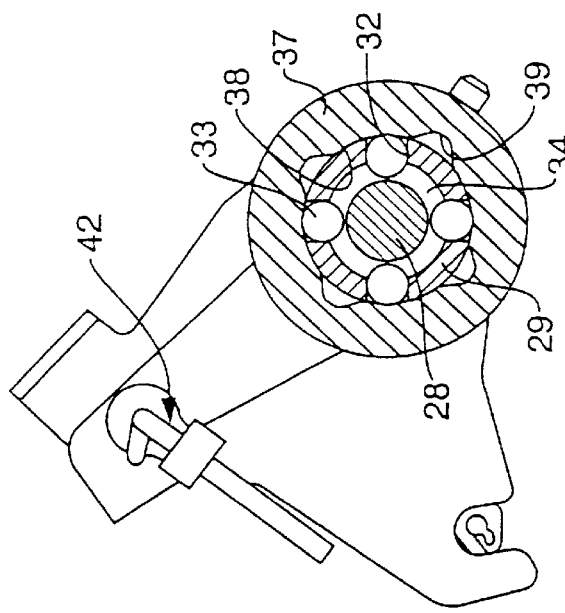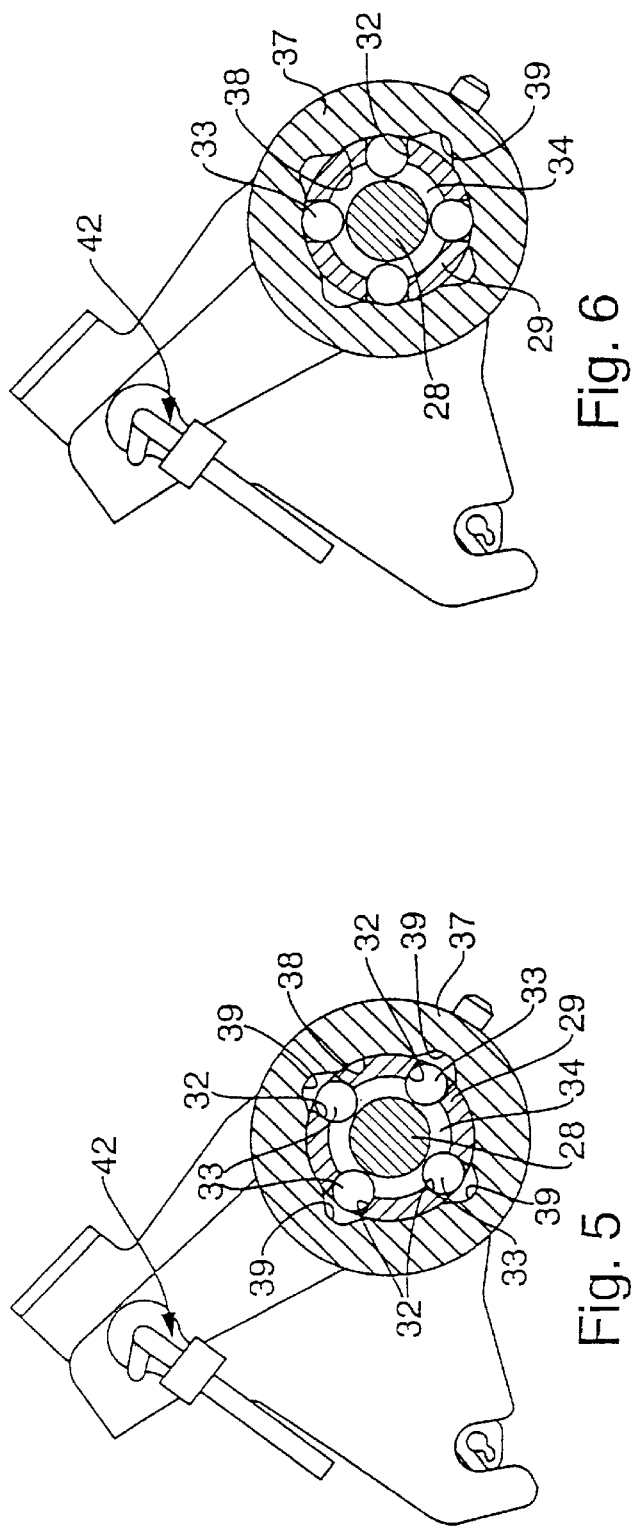

1

SEAT FOR MOTOR VEHICLES

BACKGROUND AND SUMMARY OF INVENTION

This application claims the priority of German patent document 199 43573.1, filed Sep. 13, 1999, the disclosure of which is expressly incorporated by reference herein.

The invention relates to a seat for a motor vehicle, in particular for a passenger car.

German patent documents DE-A-1 904 687 and DE 36 43 729 C2 have each disclosed a vehicle seat of the general type which the present invention is related to. The vehicle seat includes a bottom part which is supported by means of at least one front leg and at least one back leg on the vehicle floor. A bottom end of the front leg is mounted pivotably on the vehicle floor parallel to a seat transverse axis which runs transversely with respect to a seat longitudinal axis running from the back towards the front. A top end of the front leg is mounted pivotably on the bottom part of the seat, likewise parallel to the seat transverse axis. The known seat has a seat-adjustment device, by means of which the seat can be adjusted between at least two positions in the direction of the seat longitudinal axis. This seat-adjustment device has a strut which at its bottom end is mounted on the vehicle floor about the pivot axis of the bottom end of the back leg. Correspondingly, a top end of this strut is mounted pivotably on the bottom part of the seat, about the pivot axis of the top end of the front leg. The length of the strut is designed to be adjustable, a change in the length of the strut resulting in an adjustment of the seat in the longitudinal direction of the seat, so that a seat position is set by setting an associated strut length. In the known vehicle seats, the strut is fitted with an actuating drive which makes it possible to vary the strut length by manual or electric means. The actuating drive is of self-locking design, with the result that the strut length and therefore the associated seat position are fixed.

In seats of the type described in the introduction, there is a need for the seat to be adjustable as easily and quickly as possible in the longitudinal direction of the seat, so that the seat can in this way be adapted to individual requirements. To improve the accessibility of a space arranged behind the seat, for example if a further row of seats is arranged behind the seat, it is necessary to design the seat in such a way that it can be pivoted forwards, in particular if it is a rear seat or a bench of rear seats.

The present invention deals with the problem of designing a seat of the type described in the introduction in such a way that the adjustment functions of the seat work quickly and with a high level of reliability for the user and are easy to actuate.

According to the invention, this problem is solved by means of a seat for a motor vehicle, comprising:
- a bottom part which is supported in use by at least one front leg and at least one back leg on a vehicle floor, a bottom end of the front leg being mounted pivotably on the vehicle floor parallel to a seat transverse axis which runs transversely with respect to a seat longitudinal axis running from the back towards the front, a top end of the front leg mounted pivotably on the bottom part of the seat parallel to the seat transverse axis, a bottom end of the back leg being mounted pivotably on the vehicle floor parallel to the seat transverse axis, and a top end of the back leg being mounted pivotably on the bottom part of the seat parallel to the seat transverse axis, and
- a seat-adjustment device, operable to adjust the seat between at least two positions in a direction of the seat longitudinal axis, the seat-adjustment device having at least one strut, which at one end is mounted pivotably on the vehicle floor, and at the other end is mounted pivotably on the bottom part of the seat, in each case parallel to the seat transverse axis, the strut being of adjustable length, a seat position being set by setting an associated strut length, the strut having a tube and a rod which is mounted in this tube in such a manner that it can be adjusted in two directions,
- wherein the seat-adjustment device has a locking device which can be adjusted between an activated state, in which the tube and the rod are fixed relative to one another in axial positions which are each associated with one of the seat positions, and a deactivated state, in which the rod can be adjusted in two directions in the tube.

The adjustability of the seat in the longitudinal direction of the seat is made possible by a strut of adjustable length, the axial length of which can be fixed with the aid of a locking device. Consequently, the seat adjustment can be carried out relatively quickly and easily, so that in particular the comfort is enhanced. In addition, a particularly stable and reliably functioning arrangement results. The adjustment device is of compact structure.

In a particularly advantageous embodiment, the seat-adjustment device may have a securing device which, in an activated state, limits the adjustment movements of the seat, with the locking device unlocked or deactivated, in the forward direction at a forward seat position and which in a deactivated state allows a seat adjustment which goes beyond this forward seat position in the forward direction and in which the seat simultaneously moves downwards and, on reaching a forward and lower limit position, adopts a space-saving out-of-use position. This embodiment ensures that the seat is not inadvertently moved into the out-of-use position, thus reducing the risk of injury.

The problem on which the invention is based is also solved by a seat for a motor vehicle, having a bottom part, which is supported in use by at least one front leg and at least one back leg on a vehicle floor, the back leg being formed by a telescopic rod of adjustable length, a bottom end of the bottom leg being mounted pivotably on the vehicle floor and a top end of the back leg being mounted pivotably on the bottom part of the seat, in each case parallel to a seat transverse axis running transversely to the seat longitudinal axis, the bottom part of the seat being mounted pivotably, in a front region, relative to the vehicle floor, about a pivot axis running parallel to the seat transverse axis,
- wherein the seat has an entry-aid device which makes it possible to adjust the seat between an in-use position, in which the seat can be used as intended, and an entry position, in which the seat has been pivoted forwards, with respect to the in-use position, about the pivot axis in the direction of a seat longitudinal axis (which runs from the back towards the front, and thus facilitates access to a space arranged behind the seat, and
- wherein the entry-aid device has a retaining device which in an activated state secures the telescopic rod in a retracted position, associated with the in-use position, and in a deactivated state allows the length of the telescopic rod to be adjusted in order to pivot the seat.

In this case, the invention is based on the general idea of forming the back leg of the seat by a telescopic rod of adjustable length, so that the entire seat can be folded forwards about a pivot axis arranged further towards the front. During this adjustment movement, the inclination of the back leg is changed at the same time, to such an extent that the leg is moved out of the entry area which has been created as a result of the seat being folded forwards. Consequently, the back leg does not form any obstacle to access, in particular entry, to a space arranged behind the seat, so that the safety of entry and therefore the comfort of the seat or the vehicle fitted therewith is improved. Moreover, the telescopic rod at the same time forms a secure guide throughout the entire pivoting range of the seat, thus reducing wear phenomena.

According to a preferred embodiment, a retaining device, which in an activated state secures the telescopic rod in a retracted position associated with the in-use position of the seat and in a deactivated state allows the length of the telescopic rod to be adjusted in order to adjust the seat, may be formed on the telescopic rod itself, resulting in a particularly compact structure.

Preferably, the pivot axis of the top end of the strut runs coaxially with respect to the top bearing point at the top end of the front leg, so that the entire seat can be pivoted about this common pivot axis if the seat is equipped with both the entry-aid device and the seat-adjustment device which has been described above.

Further important features and advantages of the present invention will emerge from the subclaims, from the drawings and from the associated description of the figures with reference to the drawings.

It will be understood that the abovementioned features and the features which are still to be explained below can be used not only in the combination given in each case but also in other combinations or as stand-alone measures, without departing from the scope of the present invention.

Other objects, advantages and novel features of the present invention will become apparent from the following detailed description of the invention when considered in conjunction with the accompanying drawings.

BRIEF DESCRIPTION OF THE DRAWINGS

FIG. 4 shows a longitudinal section through a strut of a seat-adjustment device according to the invention;

FIG. 5 shows a cross section through the strut taken along section line V—V in FIG. 4 with a locking device shown in an unlocked state;

FIG. 6 shows a cross section similar to that of FIG. 5, but with the locking device in a locked state;

DETAILED DESCRIPTION OF THE DRAWINGS

Figure 1:
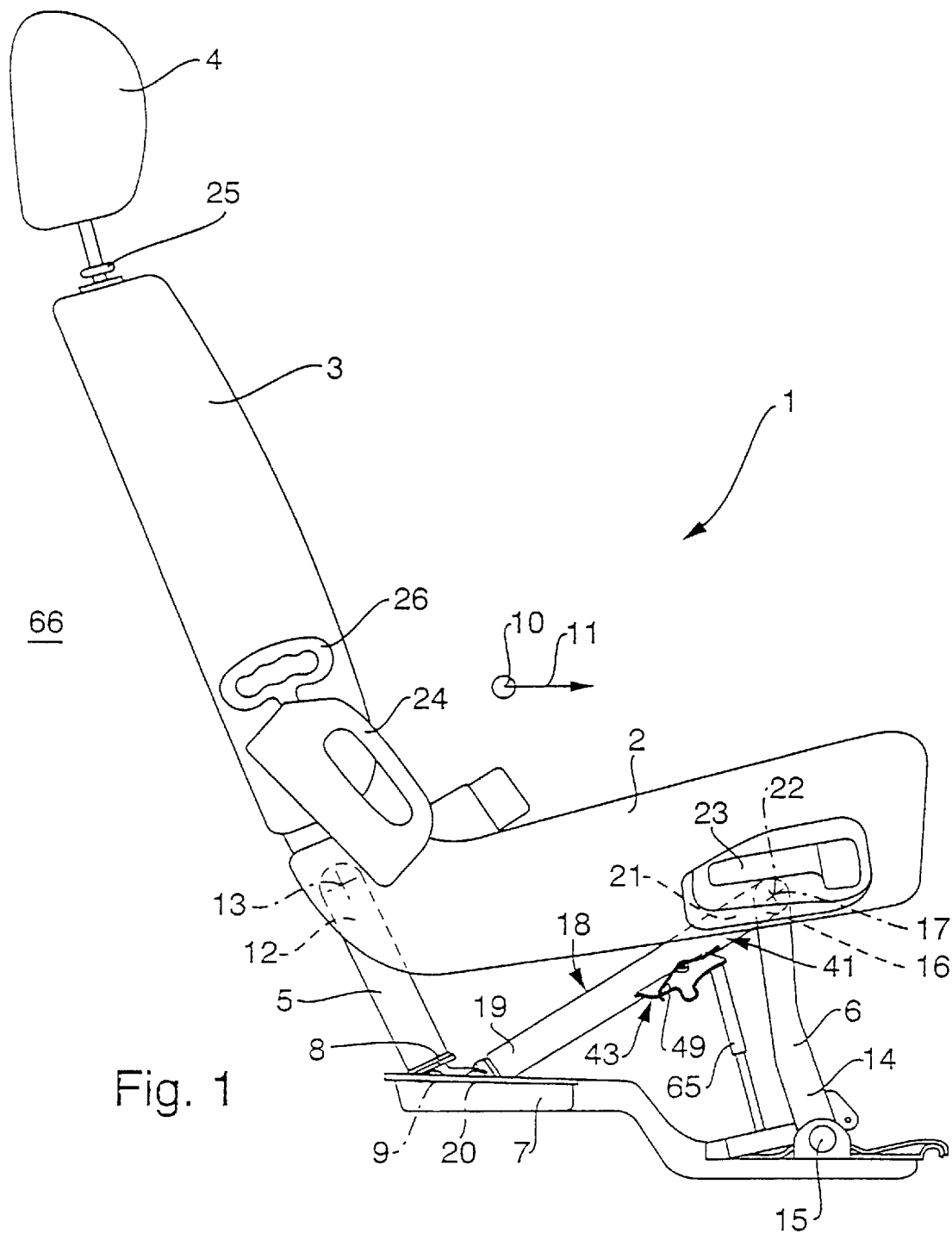
FIG. 1 shows a side view of a seat according to the invention, shown in a rear limit position.

As shown in FIG. 1, a seat 1 of a motor vehicle, in particular of a passenger car, has a bottom part 2, a back part 3 and optionally a headrest 4. The bottom part 2 of the seat is supported by means of at least one back leg 5 and by means of at least one front leg 6 on a floor 7 of the vehicle. It will be clear that the seat 1 may be either a single seat or a double or triple seat or a bench of seats. The seat illustrated here is a rear seat. In principle, however, it is also possible to design the seat 1 as a front seat.

At a bottom end 8, the back leg 5 is mounted pivotably on the vehicle floor 7 about a pivot axis 9. This pivot axis 9 runs parallel to a seat transverse axis 10 which is perpendicular to the plane of the drawing and runs perpendicular to a seat longitudinal axis 11 running from the back towards the front. The seat transverse axis 10 and the seat longitudinal axis 11 are indicated by symbols in FIG. 1. A top end 12 of the back leg 5 is mounted pivotably on the bottom part 2 of the seat about a pivot axis 13 which likewise runs parallel to the seat transverse axis 10. At a bottom end 14, the front leg 6 is mounted pivotably on the vehicle floor 7 about a pivot axis 15 which likewise runs parallel to the seat transverse axis 10. Correspondingly, a top end 16 of the front leg 6 is also mounted pivotably on the bottom part 2 of the seat about a pivot axis 17 which likewise runs parallel to the seat transverse axis 10.

Figure 7:
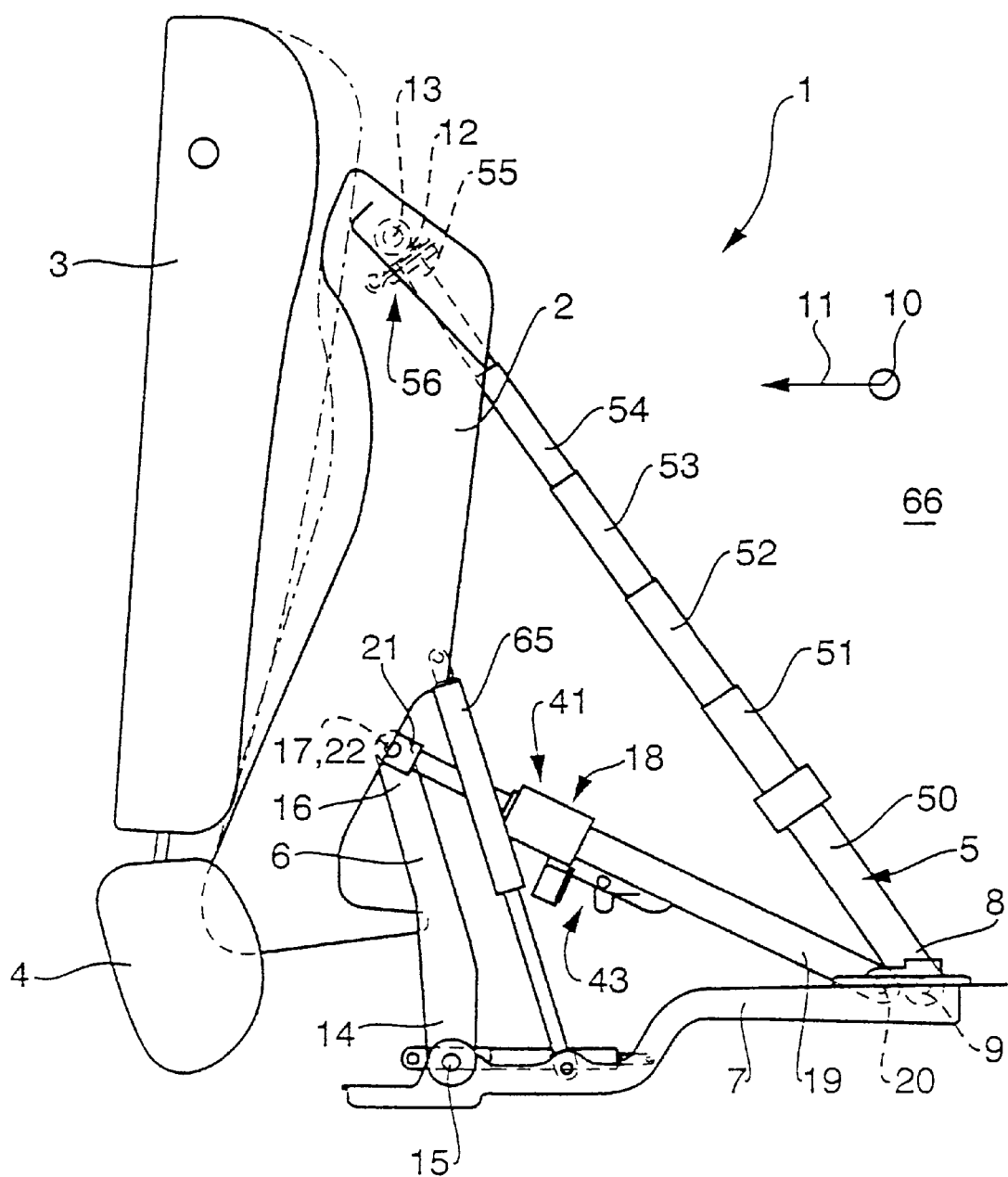
FIG. 7 shows a side view of the seat shown in FIG. 1 in an entry position.

As a result of the four-point bearing of the seat 1 on the vehicle floor 7 formed in this way, it is possible for the seat 1 to be adjusted in the direction of its longitudinal axis 11 relative to the vehicle floor 7. To ensure that these adjustments do not take place independently, the bottom part 2 of the seat is additionally supported on the vehicle floor 7 by means of at least one strut 18, this strut 18 being pivotably mounted, at a bottom end 19, in the region of the bottom end 8 of the back leg 5, on the vehicle floor 7 about a pivot axis 20 which runs parallel to the seat transverse axis 10. At a top end 21, the strut 18 is mounted pivotably, in the region of the top end 16 of the front leg 6, on the bottom part 2 of the seat about a pivot axis 22 which runs parallel to the seat transverse axis 10. In the present preferred embodiment, the top pivot axes 17 and 22 of the front leg 6 and the strut 18 are arranged coaxially with respect to one another, resulting in the possibility of adjusting the seat 1 into an entry position which is illustrated in FIG. 7 and will be described in more detail below.

To provide a seat-adjustment device, the length of the strut 18 is designed to be adjustable and the strut is provided with a locking device 41 which is described below and makes it possible to retain the strut 18 at different lengths which are each associated with one seat position. To actuate the locking device 41 of the adjustable-length strut 18, a handle 23 is provided on the seat 1, which handle is coupled to the locking device 41, for example by means of a Bowden cable (not shown in more detail).

Figure 2:
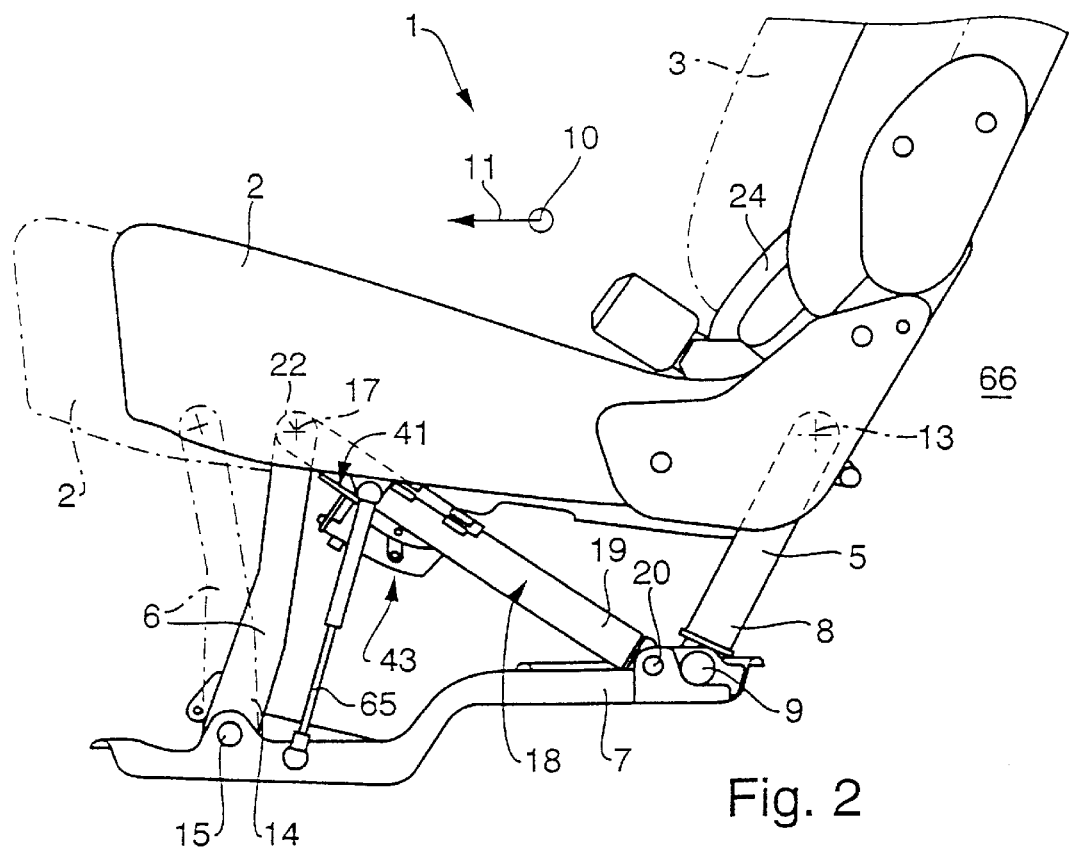
FIG. 2 shows a side view similar to FIG. 1 of a lower region of the seat, with a forward seat position indicated by dashed lines.

FIG. 1 shows the seat 1 in a rear seat position. The same position of the seat is also shown in solid lines in FIG. 2. In this rear limit position, the strut 18 is at its minimum length. In FIG. 2, dashed lines illustrate an in-use position of the seat 1 which has been adjusted forwards. This forward in-use position in this case simultaneously forms the front limit position of the seat positions provided for sitting. To reach this position, it is necessary for the length of the strut 18 to increase. The pivoting adjustment of the individual legs 5 and 6 and of the strut 18 and other components which pivot with them is not shown in FIG. 2, for the sake of clarity, and only the front region of the bottom part 2 of the seat and the bottom leg 6 are shown in the forward position of the seat.

Figure 3:
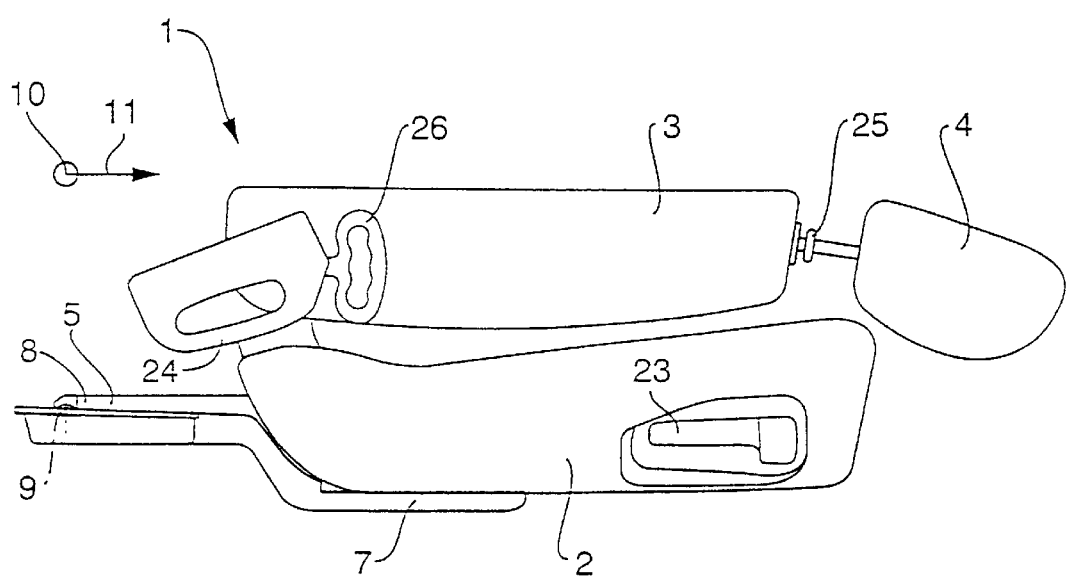
FIG. 3 shows a side view of the seat shown in FIG. 1 in an out-of-use position in which it has been moved forwards and downwards.

As shown in FIG. 1, the seat 1 is also fitted with a further handle 24, which is used to actuate a securing device 43 described in more detail below, which makes it possible to increase the length of the strut 18 beyond the length associated with the front limit position of the in-use positions of the seat 1. In this case, the seat 1 moves further forwards and, at the same time, downwards and, on reaching a limit position, moves into an out-of-use position. If, as shown in FIG. 3, the back part 3 of the seat is likewise pivoted as far forwards as possible, the seat 1 takes up a minimal amount of space. The inclination of the back part 3 can be adjusted by actuating a handle 25 which is coupled in a known way to a Bowden cable (not described in more detail).

As shown in FIG. 1, the seat 1 is furthermore equipped with a further handle 26, which can be used to deactivate a retaining device described below, for which purpose the handle 26 is coupled to this retaining device via a Bowden cable (not described in more detail). When the retaining device is in the deactivated state, the seat 1 can be pivoted into an entry position shown in FIG. 7, in which the seat I rotates about the coaxial pivot axes 17 and 22 of the front leg 6 and the strut 18. It is possible to reach a rotation angle of, for example, about 90°.

As can be seen from FIG. 7, the back leg 5 is designed as a telescopic rod, the length of which can be adjusted within a relatively wide range. In the entry position of the seat 1 illustrated in FIG. 7, the seat allows access to a space 66 which is arranged behind the seat 1 and in which, for example, a further row of seats may be arranged.

As shown in FIG. 4, the strut 18 has a tube 27 and a rod 28. The rod 28 is mounted adjustably and coaxially inside the tube 27. At one end, the tube 27 forms the bottom end 19 of the strut 18 which is intended to be mounted on the vehicle floor 7. At the other end, the tube 27 is provided with a slide bush 29 which forms an axial guide and bearing for the rod 28. The slide bush 29 is attached to the tube 27, in particular by means of a weld seam 30.

The above mentioned locking device 41, which fixes the tube 27 and the rod 28 relative to one another in axial positions which are each associated with one seat position, is formed at that end of the tube 27 which is equipped with the slide bush 29. For this purpose, the slide bush 29 is provided, in an axial plane denoted by 31, with a plurality of, in this case four, radial apertures 32, in each of which a locking element, for example in the form of a ball 33, is mounted in such a manner that it can be adjusted in the radial direction. The radial extent of the balls 33 is greater than the radial extent of the apertures 32, so that the balls 33 project in the radial direction at least on one side of the corresponding aperture 32.

On its outer side, the rod 28 is provided with a plurality of radial depressions 34, 35 and 36, which in this case are formed in the shape of encircling annular grooves. Each annular groove 34, 35, 36 or each axial plane in which one of these grooves 34, 35, 36 is arranged defines a specific length of the strut 18 and is thus associated with a defined seat position. The rod 28 is fixed relative to the tube 27 as a result of the balls 33 penetrating into one of the annular grooves 34, 35, 36, provided that this groove is in the axial plane 31. To provide a form fit, the radial extent of the grooves 34, 35, 36 is in each case shorter than the radial extent of the balls 33.

The locking device 41 is also provided with a rotary sleeve 37 which is fitted onto the outside of the slide bush 29 and is mounted on the slide bush 29 in order to carry out coaxial rotational movements. A radial recess 39, the radial extent of which is at least as great as the radial extent of the grooves 34, 35, 36 in the rod 28, is formed in an inner wall 38 of the rotary sleeve 37, in the region of the axial plane 31 for each ball.

The rotary sleeve 37 is mounted on the slide bush 29 in such a manner that it can rotate between a release position (shown in FIG. 5) and a securing position (shown in FIG. 6). In the release position shown in FIG. 5, the radial recesses 39 are aligned with the apertures 32, so that each ball 33 can be freely adjusted in the radial direction between the radially inner groove 34 or 35 or 36 and the radially outer recess 39. The rotary sleeve 37 also adopts this release position in FIG. 4, in which it can be seen that the recesses 39 are formed as axial grooves.

As shown in FIG. 6, in the securing position the inner wall 38 of the rotary sleeve 37 covers the apertures 32 and thus prevents radial adjustment of the balls 33 in the outward direction, so that the balls 33 are secured in form-fitting engagement in the annular groove 34 or 35 or 36.

As shown in FIG. 4, the rotary sleeve 37 is preloaded into its securing position by means of a coil spring 40.

The seat-adjustment device operates as follows:

The user actuates the handle 23, which is coupled to the rotary sleeve 37 via a Bowden cable. In FIGS. 5 and 6, this Bowden cable is denoted by 42. As a result of the actuation of the handle 23, the locking device 41 is deactivated or unlocked, so that the rotary sleeve 37 adopts the release position illustrated in FIG. 5. The user then pulls the seat 1 in the longitudinal direction 11 of the seat, with the result that a tensile force acts between the ends 19 and 21 of the strut 18. As a result of the grooves 34, 35 and 36 being shaped in the form of a ramp in the axial direction, this axially acting force acts on the balls 33 in the form of a radially acting force, seeking to move the balls 33 radially outwards. Since, in the release position of the rotary sleeve 37, the balls 33 can move freely in the radial direction, the balls 33 are thereby displaced into the recesses 39. The dimensions of the balls 33 and of the recesses 39 and the grooves 34, 35, 36 are selected in such a way that the rod 28, when the balls 33 have been displaced radially outwards into the recesses 39, can be adjusted in the axial direction in the slide bush 39. As a result of this bidirectional relative adjustment of the rod 28 in the tube 27, it is possible to adjust the length of the strut 18 and thus the position of the seat 1.

During this seat adjustment, the user can release the handle 23, so that the rotary sleeve 37 is driven into its securing position by the coil spring 40. However, as long as the balls 33 are in the recesses 39, it is impossible for the rotary sleeve 37 to return to its securing position shown in FIG. 6. If, over the course of the adjustment of the seat, one of the grooves 34, 35 or 36 enters the region of the axial plane 31, the balls 33 can penetrate into the corresponding annular groove 34, 35, 36. In the process, the balls are driven radially inwards by means of a suitably shaped ramp-like profiling of the recesses 39 in the circumferential direction, since the restoring moment which is introduced into the rotary sleeve 37 by the coil spring 40 is transmitted, at the ramp profile of the recesses 39, to the balls 33 bearing against it, in the form of a radially inwardly acting force. As soon as the balls 33 have penetrated into the associated annular groove 34, 35, 36, the rotary sleeve 37 which is driven by the coil spring 40 can pivot automatically into its securing position.

The annular groove 34 arranged on the left in FIG. 4 corresponds to the rear seat position illustrated in solid lines in FIG. 2, the next annular groove 35 on the right in FIG. 4 is associated with the predetermined forward seat position illustrated by dashed lines in FIG. 2, and the annular groove 36 arranged on the right in FIG. 4 is associated with the out-of-use position illustrated in FIG. 3.

Moreover, the seat-adjustment mechanism is provided with a securing device, as denoted by 43 in FIG. 4. In an activated state with the locking device 41 in an unlocked state, this securing device 43 ensures that the adjustment movements of the seat in the forward direction end at a predetermined, forward seat position. This predetermined forward seat position is illustrated by dashed lines in FIG. 2. In a deactivated state, however, the securing device 43 allows the seat to be moved beyond this predetermined forward seat position, in which event the seat 1 is simultaneously moved forwards and downwards and adopts the forward and lower limit position which is illustrated in FIG. 3 and, with the back part 3 folded suitably, results in a particularly space-saving out-of-use position.

In accordance with FIG. 4, the securing device 43 has a securing catch 44 which is arranged on the outside of the tube 27. When the securing device 43 is in the activated state, this securing catch 44 penetrates through an opening 45 formed in the tube 27, into the interior of the tube 27. An axial cutout or longitudinal groove 46, into which the securing catch 44 can penetrate, is formed in the rod 28. Axial ends 47 and 48 of this cutout 46 interact with the catch 44 as axial stops and thus limit the relative adjustability between tube 27 and rod 28, as long as the securing catch 44 projects into this cutout 46 with the securing device 43 in the activated state. The securing catch 44 which projects into the cutout 46 limits the adjustability between rod 28 and tube 27, so that an adjustment movement which goes beyond the predetermined forward seat position cannot take place unintentionally. The catch 44 is coupled to the associated handle 24 via a Bowden cable (not shown), and when the handle is actuated the catch 44 is pulled out of the cutout 46. As soon as the securing device 43 is deactivated in this way, tube 27 and rod 28 can be moved relative to one another independently of the securing device 43.

The securing device 43 operates as follows:

If the user would like to adjust the seat 1 into the out-of-use position illustrated in FIG. 3, he firstly actuates the handle 23, in order to move the seat forwards. Moreover, the user actuates the handle 24, in order to deactivate the securing device 43 and to move the securing catch 44 out of the cutout 46. When the locking device 41 has been deactivated and the securing device 43 has been deactivated, the seat 1 can be moved forwards and downwards beyond the predetermined forward seat position shown in FIG. 2. As soon as the out-of-use position shown in FIG. 3 is reached, the balls 3 can latch into the annular groove 36.

The securing device 43 is provided with a spring 49 which preloads the securing catch 44 towards the interior of the tube, so that when the seat 1 moves out of the out-of-use position illustrated in FIG. 3 into one of the in-use positions illustrated in FIG. 2, the catch 44 automatically penetrates into the cutout 46 and secures the seat 1 ready for use.

In another design, the handle 24 for actuating the securing device 43 may additionally be coupled to the locking device 41, so that the user only has to actuate one handle, namely the handle 24, in order to move the seat 1 into its out-of-use position. In addition, the handle 24 may be coupled to the inclination-adjustment mechanism of the back part 3, so that one handle can be used to pivot the back part 3 forwards at the same time.

Figure 8:
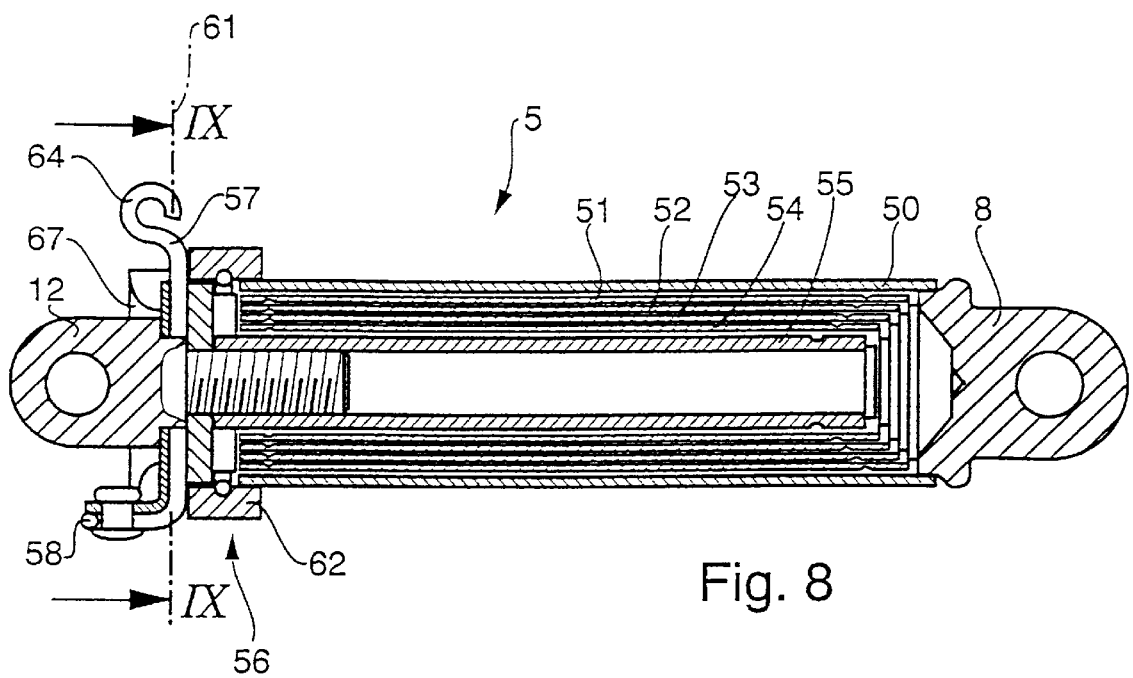
FIG. 8 shows a longitudinal section through a back leg of the seat which is designed as a telescopic rod in accordance with the invention, shown in a retracted position.

As shown in FIG. 8, the back leg 5 is designed as a telescopic rod. The telescopic rod or the back leg 5 has an outer tube 50 and a plurality of, in this case four, inner tubes 51, 52, 53, 54 as well as an inner rod 55, the inner rod 55 and the inner tubes 51, 52, 53, 54 being extendable and retractable coaxially with respect to the outer tube 50. The way in which a telescopic rod 5 functions is generally known and therefore requires no further explanation.

The bottom end 8 of the back leg 5 is formed on the outer tube 50, while the inner rod 55 bears the top end 12 of the back leg 5. As an alternative, the inner rod 55 may be mounted pivotably on the bottom part of the seat and the outer tube 50 may be mounted pivotably on the vehicle floor. A retaining device 56 is formed in the region of the top end 12, which retaining device, in the activated state, secures the telescopic rod 5 in the retracted position illustrated in FIG. 8. When the retaining device 56 is in the deactivated state, the length of the telescopic rod 5 can change between the fully retracted position illustrated in FIG. 8 and the fully extended position illustrated in FIG. 7.

Figure 9:
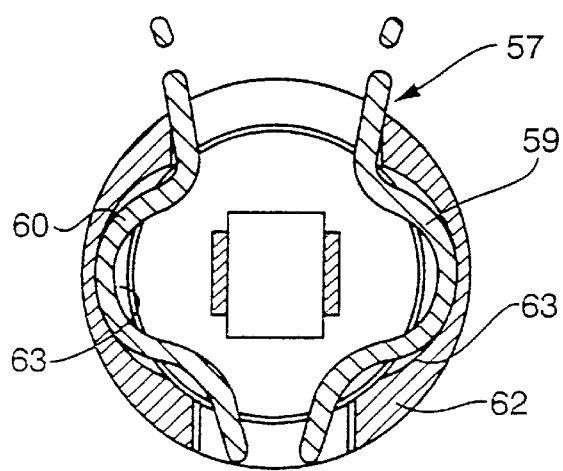
FIG. 9 shows a cross section through a retaining device of the telescopic rod on section lines IX—IX in FIG. 8.

The retaining device 56 has a spring clamp 57 which, as shown in FIG. 9, is of substantially C-shaped structure. The spring clamp 57 has two limbs 59 and 60 which are connected to one another via a base 58. The base 58 of the spring clamp 57 is attached to the inner rod 55, in such a manner that the spring limbs 59 and 60 are arranged substantially in one axial plane 61.

In an end of the outer tube 50 which faces towards the retaining device 56, an axial section 62 is formed thereon, on the inner side of which axial section crescent-shaped locking sockets 63, which lie in the axial plane, are formed. In the retracted position of the telescopic rod 5 illustrated in FIG. 8, the spring limbs 59 and 60, which are of correspondingly convex form, latch into these locking sockets 63 and, as a result, secure the inner rod 55 on the outer tube 50 in a form-fitting manner.

The retaining device 56 operates as follows:

If the user wishes to move the seat 1 into the entry position illustrated in FIG. 7, he actuates the handle 26, which is coupled to free ends 64 of the spring limbs 59 and 60 via a Bowden cable (not shown), with the result that these ends are moved towards one another. In the process, the spring limbs 59 and 60 are moved radially inwards out of the locking sockets 63, so that the retaining of the inner rod 55 relative to the outer tube 50 is eliminated. The user then pushes the seat 1 forwards, the seat pivoting about the pivot axes 17 and 22 of the front leg 6 and the strut 18, respectively. At the same time, the telescopic rod 5 is extended. The adjustment movement aimed at reaching the entry position shown in FIG. 7 can be assisted by means of a pneumatic spring element 65.

If the user wishes to achieve a particularly substantial adjustment of the seat, he can fold the back part 3 of the seat 1 forwards before or at the same time as the pivoting of the seat 1. In this way, it is possible, for example, to pivot the seat through about 90°. In this case too, in a specific variant, the handle 26 for actuating the retaining device 56 may be coupled to the inclination-adjustment mechanism of the back part 3, in order to use one handle to pivot both the back part 3 and the bottom part 2 forwards into the preferred entry position illustrated in FIG. 7.

It is clear from FIG. 7 that the back leg 5 of the seat 1, in the entry position, unlike in the in-use positions of the seat 1 shown in FIG. 2, is no longer inclined backwards, but rather, starting from the vehicle floor 7, is inclined forwards, with the result that the back leg 5 does not cause any interference to entry into the space 66 which is at the back of the seat 1.

The return of the seat 1 to an in-use position can be damped by suitable damping means, in order to reduce the risk of injury from the returning seat 1. By way of example, the spring element 65 may be designed as a spring damper element. To damp the restoring movement, it is in particular also possible for the telescopic rod 5 to be designed in such a way that its retraction movement takes place counter to an internal damping force.

To automatically latch the spring limbs 59 and 60 into the associated locking sockets 63, the axial section 62 is provided with a guide 67 which, during retraction of the inner rod 55 into the outer tube 50, by means of a tapering contour, displaces and preloads the spring limbs 59, 60 towards one another. As soon as the spring limbs 59, 60 are then aligned with the locking sockets 63, they can latch automatically into these sockets.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Seat for a motor vehicle, comprising:

a bottom part which is supported in use by at least one front leg and at least one back leg on a vehicle floor, a bottom end of the front leg being mounted pivotably on the vehicle floor parallel to a seat transverse axis which runs transversely with respect to a seat longitudinal axis running from the back of the seat towards the front of the seat, a top end of the front leg being mounted pivotably on the bottom part of the seat parallel to the seat transverse axis, a bottom end of the back leg being mounted pivotably on the vehicle floor parallel to the seat transverse axis, and a top end of the back leg being mounted pivotably on the bottom part of the seat parallel to the seat transverse axis, and a seat-adjustment device operable to adjust the seat between at least two positions in a direction of the seat longitudinal axis, the seat-adjustment device having at least one strut, which at one end is mounted pivotably on the vehicle floor, and at the other end is mounted pivotably on the bottom part of the seat, in each case parallel to the seat transverse axis, the strut being of adjustable length, a seat position being set by setting an associated strut length, the strut having a tube and a rod which is mounted in the tube in such a manner that the rod can be adjusted in two directions, wherein the seat-adjustment device has a locking device which can be adjusted between an activated state, in which the tube and the rod are fixed relative to one another in axial positions which are each associated with one of the seat positions, and a deactivated state, in which the rod can be adjusted in two directions in the tube, wherein the locking device has a slide bush which is fixedly connected to the tube, in which said slide bush the rod is mounted in such a manner that the rod can be adjusted in a controlled manner in the axial direction, and in which at least one radial aperture is formed in an axial plane, wherein a locking element, is accommodated in each said radial aperture, said locking element being mounted in the aperture in such a manner that the locking element can be adjusted in the radial direction, the radial extent of the locking element being greater than the radial extent of the aperture, wherein each of the axial positions between the tube and the rod, which can be fixed by the locking device is assigned the axial plane on the rod, in which said axial plane at least one radial depression is formed into which the locking elements can penetrate in the radial direction, the radial extent of the depressions being shorter than the radial extent of the locking element, wherein the locking device has a rotary sleeve which is fitted coaxially onto an outside of the slide bush and is mounted on the slide bush in such a manner that the locking device can be adjusted rotationally between a securing position and a release position, wherein, in the axial plane for each said locking element, a radial recess is provided in an inner wall of the rotary sleeve, the radial extent of each of said recesses is at least as great as the radial extent of the depressions in the rod, wherein, in the release position, the radial recesses are flush with the radial apertures, so that each said locking element can be freely adjusted in the radial direction between the respective depression and recess, and wherein, in the securing position, the inner wall of the rotary sleeve covers the at least one radial aperture and thereby secures the corresponding locking element in the associated depression in the rod.

2. Seat according to claim 1, wherein the locking device has spring means which preload the rotary sleeve into the securing position thereof.

3. Seat according to claim 1, wherein the radial recesses in the rotary sleeve, have a ramp profile in the circumferential direction configured in such a manner that a moment which acts on the rotary sleeve in the direction of the securing position transmits a radially inwardly acting force to the locking element which bears against the ramp profile.

4. Seat according to claim 2, wherein the radial recesses in the rotary sleeve, have a ramp profile in the circumferential direction configured in such a manner that a moment which acts on the rotary sleeve in the direction of the securing position transmits a radially inwardly acting force to the locking element which bears against the ramp profile.

5. Seat according to one of claim 1, wherein the strut of the seat-adjustment device at one end is mounted pivotably in the region of the bottom end of the back leg and at the other end is mounted pivotably in the region of the top end of the front leg (6).

6. Seat according to one of claim 2, wherein the strut of the seat-adjustment device at one end is mounted pivotably in the region of the bottom end of the back leg and at the other end is mounted pivotably in the region of the top end of the front leg.

7. Seat according to one of claim 3, wherein the strut of the seat-adjustment device at one end is mounted pivotably in the region of the bottom end of the back leg and at the other end is mounted pivotably in the region of the top end of the front leg.

8. Seat according to claim 1, wherein the seat-adjustment device has a securing device which, in an activated state, limits the adjustment movements of the seat, with the locking device unlocked, in the forward direction at a forward seat position and which in a deactivated state allows a seat adjustment which goes beyond the forward seat position in the forward direction and in which the seat simultaneously moves downwards and, on reaching a forward and lower limit position, is in an out-of-use position.

9. Seat according to claim 2,
wherein the seat-adjustment device has a securing device which, in an activated state, limits the adjustment movements of the seat, with the locking device unlocked, in the forward direction at a forward seat position and which in a deactivated state allows a seat adjustment which goes the this forward seat position in the forward direction and in which the seat simultaneously moves downwards and, on reaching a forward and lower limit position, is in an out-of-use position.

10. Seat according to claim 3,
wherein the seat-adjustment device has a securing device which, in an activated state, limits the adjustment movements of the seat, with the locking device unlocked, in the forward direction at a forward seat position and which in a deactivated state allows a seat adjustment which goes beyond the forward seat position in the forward direction and in which the seat simultaneously moves downwards and, on reaching a forward and lower limit position, is in an out-of-use position.

11. Seat for a motor vehicle, comprising:

a bottom part which is supported in use by at least one front leg and at least one back leg on a vehicle floor, a bottom end of the front leg being mounted pivotably on the vehicle floor parallel to a seat transverse axis which runs transversely with respect to a seat longitudinal axis running from the back of the seat towards the front of the seat, a top end of the front leg being mounted pivotably on the bottom part of the seat parallel to the seat transverse axis, a bottom end of the back leg being mounted pivotably on the vehicle floor parallel to the seat transverse axis, and a top end of the back leg being mounted pivotably on the bottom part of the seat parallel to the seat transverse axis, and a seat-adjustment device operable to adjust the seat between at least two positions in a direction of the seat longitudinal axis, the seat-adjustment device having at least one strut, which at one end is mounted pivotably on the vehicle floor, and at the other end is mounted pivotably on the bottom part of the seat, in each case parallel to the seat transverse axis, the strut being of adjustable length, a seat position being set by setting an associated strut length, the strut having a tube and a rod which is mounted in the tube in such a manner that the rod can be adjusted in two directions, wherein the seat-adjustment device has a locking device which can be adjusted between an activated state, in which the tube and the rod are fixed relative to one another in axial positions which are each associated with one of the seat positions, and a deactivated state, in which the rod can be adjusted in two directions in the tube, and wherein the seat-adjustment device has a securing device which, in an activated state, limits the adjustment movements of the seat, with the locking device unlocked, in the forward direction at a forward seat position and which in a deactivated state allows a seat adjustment which goes beyond the forward seat position in the forward direction and in which the seat simultaneously moves downwards and, on reaching a forward and lower limit position, is in an out-of-use position.

12. Seat according to claim 11,
wherein the securing device has a securing catch which is arranged on an outside of the tube of the strut and, when the securing device is in the activated state, engages through an opening formed in the tube into an axial cutout formed in the rod of the strut, at least one axial end of the cutout interacting as a stop with the securing catch and limiting the adjustability between the tube and the rod when the locking device is in an unlocked state, the securing catch being able to move out of the cutout in order to deactivate the securing device.

13. Seat for a motor vehicle, comprising:

a bottom part which is supported in use by at least one front leg and at least one back leg on a vehicle floor, a bottom end of the front leg being mounted pivotably on the vehicle floor parallel to a seat transverse axis which runs transversely with respect to a seat longitudinal axis running from the back of the seat towards the front of the seat, a top end of the front leg being mounted pivotably on the bottom part of the seat parallel to the seat transverse axis, a bottom end of the back leg being mounted pivotably on the vehicle floor parallel to the seat transverse axis, and a top end of the back leg being mounted pivotably on the bottom part of the seat parallel to the seat transverse axis, and a seat-adjustment device operable to adjust the seat between at least two positions in a direction of the seat longitudinal axis, the seat-adjustment device having at least one strut, which at one end is mounted pivotably on the vehicle floor, and at the other end is mounted pivotably on the bottom part of the seat, in each case parallel to the seat transverse axis, the strut being of adjustable length, a seat position being set by setting an associated strut length, the strut having a tube and a rod which is mounted in the tube in such a manner that the rod can be adjusted in two directions, wherein the seat-adjustment device has a locking device which can be adjusted between an activated state, in which the tube and the rod are fixed relative to one another in axial positions which are each associated with one of the seat positions, and a deactivated state, in which the rod can be adjusted in two directions in the tube, wherein the strut of the seat-adjustment device at one end is mounted pivotably in the region of the bottom end of the back leg and at the other end is mounted pivotably in the region of the top end of the front leg, and wherein the seat-adjustment device has a securing device which, in an activated state, limits the adjustment movements of the seat, with the locking device unlocked, in the forward direction at a forward seat position and which in a deactivated state allows a seat adjustment which goes beyond the forward seat position in the forward direction and in which the seat simultaneously moves downwards and, on reaching a forward and lower limit position, is in an out-of-use position.

14. Seat for a motor vehicle, comprising:

a bottom part which is supported in use by at least one front leg and at least one back leg on a vehicle floor, a bottom end of the front leg being mounted pivotably on the vehicle floor parallel to a seat transverse axis which runs transversely with respect to a seat longitudinal axis running from the back of the seat towards the front of the seat, a top end of the front leg being mounted pivotably on the bottom part of the seat parallel to the seat transverse axis, a bottom end of the back leg being mounted pivotably on the vehicle floor parallel to the seat transverse axis, and a top end of the back leg being mounted pivotably on the bottom part of the seat parallel to the seat transverse axis, and a seat-adjustment device operable to adjust the seat between at least two positions in a direction of the seat longitudinal axis, the seat-adjustment device having at least one strut, which at one end is mounted pivotably on the vehicle floor, and at the other end is mounted pivotably on the bottom part of the seat, in each case parallel to the seat transverse axis, the strut being of adjustable length, a seat position being set by setting an associated strut length, the strut having a tube and a rod which is mounted in the tube in such a manner that the rod can be adjusted in two directions, wherein the seat-adjustment device has a locking device which can be adjusted between an activated state, in which the tube and the rod are fixed relative to one another in axial positions which are each associated with one of the seat positions, and a deactivated state, in which the rod can be adjusted in two directions in the tube, wherein the seat has an entry-aid device which makes the seat adjustable between an in-use position, in which the seat can be used as intended, and an entry position, in which the seat has been pivoted forwards, with respect to the in-use position, about a pivot axis in the direction of the seat longitudinal axis which runs from the back of the seat towards the front of the seat, and thus facilitates access to a space arranged behind the seat, and wherein the entry-aid device has a retaining device which in an activated state secures a telescopic rod in a retracted position, associated with the in-use position, and in a deactivated state allows the length of the telescopic rod to be adjusted in order to pivot the seat.

15. Seat for a motor vehicle, having a bottom part, which is supported in use by at least one front leg and at least one back leg on a vehicle floor, the back leg being formed by a telescopic rod of adjustable length, a bottom end of the back leg being mounted pivotably on the vehicle floor and a top end of the back leg being mounted pivotably on the bottom part of the seat, in each case parallel to a seat transverse axis running transversely to a seat longitudinal axis, the bottom part of the seat being mounted pivotably, in a front region, relative to the vehicle floor, about a pivot axis running parallel to the seat transverse axis, wherein the seat has an entry-aid device which makes the seat adjustable between an in-use position, in which the seat can be used as intended, and an entry position, in which the seat has been pivoted forwards, with respect to the in-use position, about the pivot axis in the direction of the seat longitudinal axis which runs from the back of the seat towards the front of the seat, and thus facilitates access to a space arranged behind the seat, wherein the entry-aid device has a retaining device which in an activated state secures the telescopic rod in a retracted position, associated with the in-use position, and in a deactivated state allows the length of the telescopic rod to be adjusted in order to pivot the seat, wherein the telescopic rod has an outer tube and an inner rod which can be retracted and extended coaxially with respect to the tube, wherein one of the outer tube and inner rod is mounted pivotably on the bottom part of the seat and the other is mounted pivotably on the vehicle floor, wherein, in a section facing towards a bearing point of the inner rod, at least one locking member is mounted on the inner rod in such a manner that the locking member can be adjusted in a radial direction, wherein, in a section facing away from a bearing point of the outer tube, a radial locking socket is formed on the outer tube for each said locking member into said locking socket the corresponding locking member can engage in the radial direction when the inner rod has been retracted into the outer tube, and wherein the retaining device has an actuator, with which the at least one locking member can be pulled out of the locking socket in order to deactivate the retaining device.

16. Seat according to claim 15, wherein the retaining device has a spring which preloads the at least one locking member for engagement in the corresponding locking socket.

17. Seat according to claim 15.

wherein the retaining device has a substantially C-shaped spring clamp, which has two limbs which are connected to one another via a base, said limbs each serving as a locking member, wherein the base of the spring clamp is attached to the inner rod in such a way that the limbs can be adjusted resiliently substantially in an axial plane, and wherein the actuator acts on free ends of the limbs and, in order to deactivate the retaining device, the limbs move towards one another, counter to a spring force, the limbs moving out of the associated locking sockets.

18. Seat according to claim 16, wherein the retaining device has a substantially C-shaped spring clamp which has two limbs which are connected to one another via a base, said limbs each serving as a locking member, wherein the base of the spring clamp is attached to the inner rod in such a way that the limbs can be adjusted resiliently substantially in an axial plane, and wherein the actuator acts on free ends of the limbs and, in order to deactivate the retaining device, the limbs move towards one another, counter to a spring force, the limbs moving out of the associated locking sockets.

19. Seat according to claim 15, wherein the retaining device is formed on the telescopic rod.

20. Seat according to claim 16, wherein the retaining device is formed on the telescopic rod.

21. Seat according to claim 17, wherein the retaining device is formed on the telescopic rod.

22. Seat according to claim 18, wherein the retaining device is formed on the telescopic rod.

23. Seat for a motor vehicle, having a bottom part, which is supported in use by at least one front leg and at least one back leg on a vehicle floor, the back leg being formed by a telescopic rod of adjustable length, a bottom end of the back leg being mounted pivotably on the vehicle floor and a top end of the back leg being mounted pivotably on the bottom part of the seat, in each case parallel to a seat transverse axis running transversely to a seat longitudinal axis, the bottom part of the seat being mounted pivotably, in a front region, relative to the vehicle floor, about a pivot axis running parallel to the seat transverse axis, wherein the seat has an entry-aid device which makes the seat adjustable between an in-use position, in which the seat can be used as intended, and an entry position, in which the seat has been pivoted forwards, with respect to the in-use position, about the pivot axis in the direction of the seat longitudinal axis which runs from the back of the seat towards the front of the seat, and thus facilitates access to a space arranged behind the seat, wherein the entry-aid device has a retaining device which in an activated state secures the telescopic rod in a retracted position, associated with the in-use position, and in a deactivated state allows the length of the telescopic rod to be adjusted in order to pivot the seat, and wherein the retaining device is formed on the telescopic rod.

24. Seat for a motor vehicle, having a bottom part, which is supported in use by at least one front leg and at least one back leg on a vehicle floor, the back leg being formed by a telescopic rod of adjustable length, a bottom end of the back leg being mounted pivotably on the vehicle floor and a top end of the back leg being mounted pivotably on the bottom part of the seat, in each case parallel to a seat transverse axis running transversely to a seat longitudinal axis, the bottom part of the seat being mounted pivotably, in a front region, relative to the vehicle floor, about a pivot axis running parallel to the seat transverse axis, wherein the seat has an entry-aid device which makes the seat adjustable between an in-use position, in which the seat can be used as intended, and an entry position, in which the seat has been pivoted forwards, with respect to the in-use position, about the pivot axis in the direction of the seat longitudinal axis which runs from the back of the seat towards the front of the seat, and thus facilitates access to a space arranged behind the seat, wherein the entry-aid device has a retaining device which in an activated state secures the telescopic rod in a retracted position, associated with the in-use position, and in a deactivated state allows the length of the telescopic rod to be adjusted in order to pivot the seat, and wherein a pivot axis of a top end of a strut of the entry-aid device runs coaxially with respect to a pivot axis of a top end of the front leg.

* * * * *